US 6,732,764 B2

(12) United States Patent
Miyamoto et al.

(10) Patent No.: US 6,732,764 B2
(45) Date of Patent: May 11, 2004

(54) ROTATABLE HOLDER

(75) Inventors: Masaji Miyamoto, Shizuoka-ken (JP); Ryoichi Fukumoto, Aichi-ken (JP)

(73) Assignees: Yazaki Corporation, Tokyo (JP); Aisin Seiki Kabushiki Kaisha, Aichi-ken (JP)

( * ) Notice: Subject to any disclaimer, the term of this patent is extended or adjusted under 35 U.S.C. 154(b) by 0 days.

(21) Appl. No.: 10/292,428

(22) Filed: Nov. 13, 2002

(65) Prior Publication Data

US 2003/0102142 A1 Jun. 5, 2003

(30) Foreign Application Priority Data

Nov. 14, 2001 (JP) ...................... P 2001-348936

(51) Int. Cl.[7] ............................... F16L 11/00
(52) U.S. Cl. .................. 138/110; 138/114; 138/108; 138/157; 248/74.4; 285/419
(58) Field of Search .................. 138/110, 109, 138/108, 156, 157, 114, 161; 248/74.4, 73, 74.1; 285/419, 903; 174/92

(56) References Cited

U.S. PATENT DOCUMENTS 3,711,633 A * 1/1973 Ghirardi et al. ............ 174/135
4,470,622 A * 9/1984 Pate et al. .................. 285/419
4,478,278 A * 10/1984 Klein ......................... 166/105
6,053,749 A    4/2000 Masuda et al. .............. 439/98
6,085,795 A    7/2000 Ogawa et al. .............. 138/108
6,595,473 B2 * 7/2003 Aoki et al. ................. 248/74.4
2003/0102142 A1 * 6/2003 Miyamoto et al. ......... 174/52.1

FOREIGN PATENT DOCUMENTS

| EP | 1312511 A1 * | 5/2003 | ........... B60R/16/02 |
| EP | 1312845 A1 * | 5/2003 | ............ F16L/3/16 |
| JP | 11008922     | 1/1999 |                       |
| JP | 2000002364   | 1/2000 |                       |

* cited by examiner

Primary Examiner—Patrick Brinson
(74) Attorney, Agent, or Firm—Finnegan, Henderson, Farabow, Garrett & Dunner, L.L.P.

(57) ABSTRACT

A rotary holder for a corrugated tube is formed such that an inner rotary body containing a corrugated tube is received in an inner portion of an outer fixing body, and an outer peripheral sliding surface of the inner rotary body may rotate relative to the outer fixing body. The inner rotary body is formed by assembling two divided rotary members, each having a round arch surface on an outer periphery thereof. The outer peripheral sliding surface is formed by abutting a surface of each divided rotary member against each other. Further, a cut surface retracting inside from a rotation locus of the round arch surface in each divided rotary member is formed in each end portion of the round arch surface.

20 Claims, 11 Drawing Sheets

ROTATABLE HOLDER

BACKGROUND OF THE INVENTION

1. Field of the Invention

The present invention relates to a holder for rotatably securing a corrugated tube in which a wire harness is received.

2. Description of the Related Art

A rotary holder for a corrugated tube as shown in FIGS. 1 to 5 has been known conventionally. A rotary holder for a corrugated tube 1 is, as shown in FIGS. 1 to 2, composed of an outer fixing body 2 and an inner rotary body 3 received rotatably in an inner portion of the outer fixing body 2. A corrugated tube 4 containing a wire harness W therein is held in an inner portion of the inner rotary body 3.

As shown in FIGS. 1 to 3, the outer fixing body 2 is composed of a base member 5 and a cover 6 locked to the base member 5. An inner rotary chamber 8 surrounded by a round inner sliding surface 7 is formed in an inner portion of the outer fixing body 2.

Further, as shown in FIGS. 1 and 4, the inner rotary body 3 is composed of two semi-cylindrical divided rotary members 9, 9 each of which has a round arch surface 9a on an outer periphery of itself. The inner rotary body 3 is formed by abutting surface 9b of one divided rotary member 9 against a surface 9b of the other divided rotary member 9. Further, a round outer peripheral sliding surface 10 is formed by assembling a round arch surface 9a of one divided rotary member 9 to a round arch surface 9a of the other divided rotary member 9 without generating a step or an offset. The outer peripheral sliding surface 10 of the inner rotary body 3 slides on the inner sliding surface 7 of the outer fixing body 2, whereby the inner rotary body 3 may rotate relative to the outer fixing body 2. On the basis of the structure mentioned above, the corrugated tube 4 is secured to the inner rotary body and allowed to rotate.

However, in the conventional rotary holder 1 for the corrugated tube, in order to hold the corrugated tube 4 in the inner portion of the inner rotary body 3, the inner rotary body 3 is formed by assembling the divided rotary members 9, 9 with each other. Accordingly, as shown in FIG. 5, it may be possible that the abutting surface 9b of one divided rotary member 9 is displaced relative to the abutting surface 9b of the other divided rotary member 9 due to an outward force applied by the corrugated tube 4 held in the inner portion of the inner rotary body 3, and due to failure of a locking means 11, 11 provided in the divided rotary members 9, 9 respectively. Once the displacement is generated between the abutting surfaces 9b, 9b, an offset portion 12 is generated where the round arch surface 9a of one divided rotary member 9 has been smoothly connected to the round arch surface 9a of the other divided rotary member 9. Under this state the radius of rotation of the inner rotary body 3 is increased equal to an amount of offset d2. Therefore, the inner rotary body 3 cannot smoothly rotate in the inner portion of the outer fixing body 2.

SUMMARY OF THE INVENTION

It is an object of the present invention to provide a rotary holder for a corrugated tube wherein an inner rotary body can always move smoothly on an inner sliding surface of an outer fixing body even in the case that a displacement is generated in each of butt surfaces between a plurality of divided rotary members.

In order to achieve the objective mentioned above, the present invention provides a rotary holder for a corrugated tube comprising:

an inner rotary body constituted by two or more divided rotary members each having a round arch surface on an outer periphery thereof, and receiving the corrugated tube by abutting surfaces of the two or more divided rotary members together; and an outer fixing body having an inner rotary chamber with an inner sliding surface along which an outer peripheral sliding surface formed by the round arch surfaces of the assembled two or more divided rotary members slide; wherein each end portion of the round arch surface in the divided rotary member has a cut surface retracting inside from a rotation locus of the round arch surface.

DESCRIPTION OF THE PREFERRED EMBODIMENTS

In the following, an embodiment of the present invention will be explained on the basis of the drawings.

As shown in FIGS. 6 to 11, a rotary holder for a corrugated tube 20 is composed of an outer fixing body 21, and an inner rotary body 22 received rotatably in an inner portion of the outer fixing body 21. A corrugated tube 23 made of a rubber or the like and containing a wire harness W is held in an inner portion of the inner rotary body 22.

Figure 1:
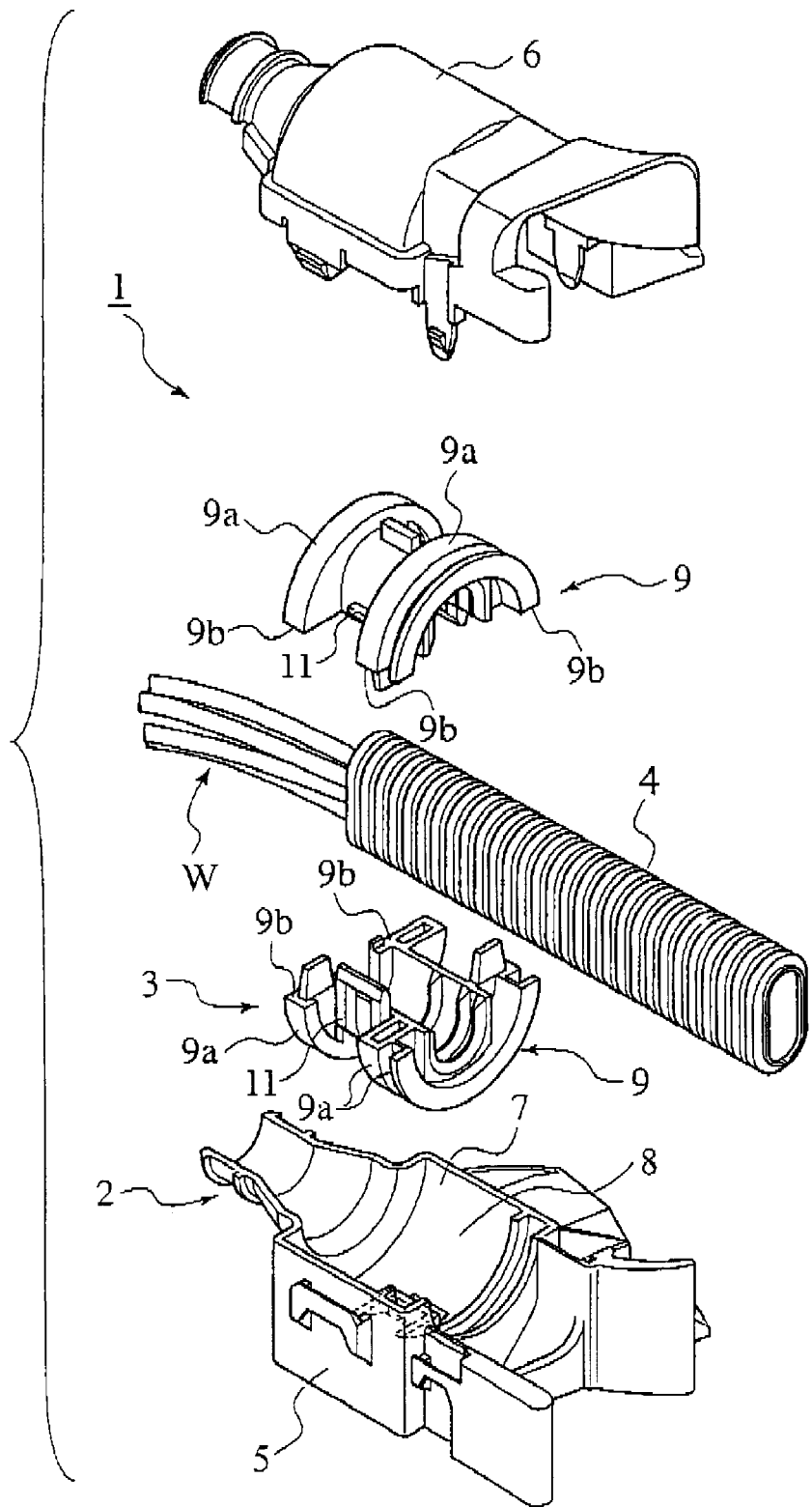
FIG. 1 is an exploded perspective view of a conventional rotary holder for a corrugated tube.
Figure 2:
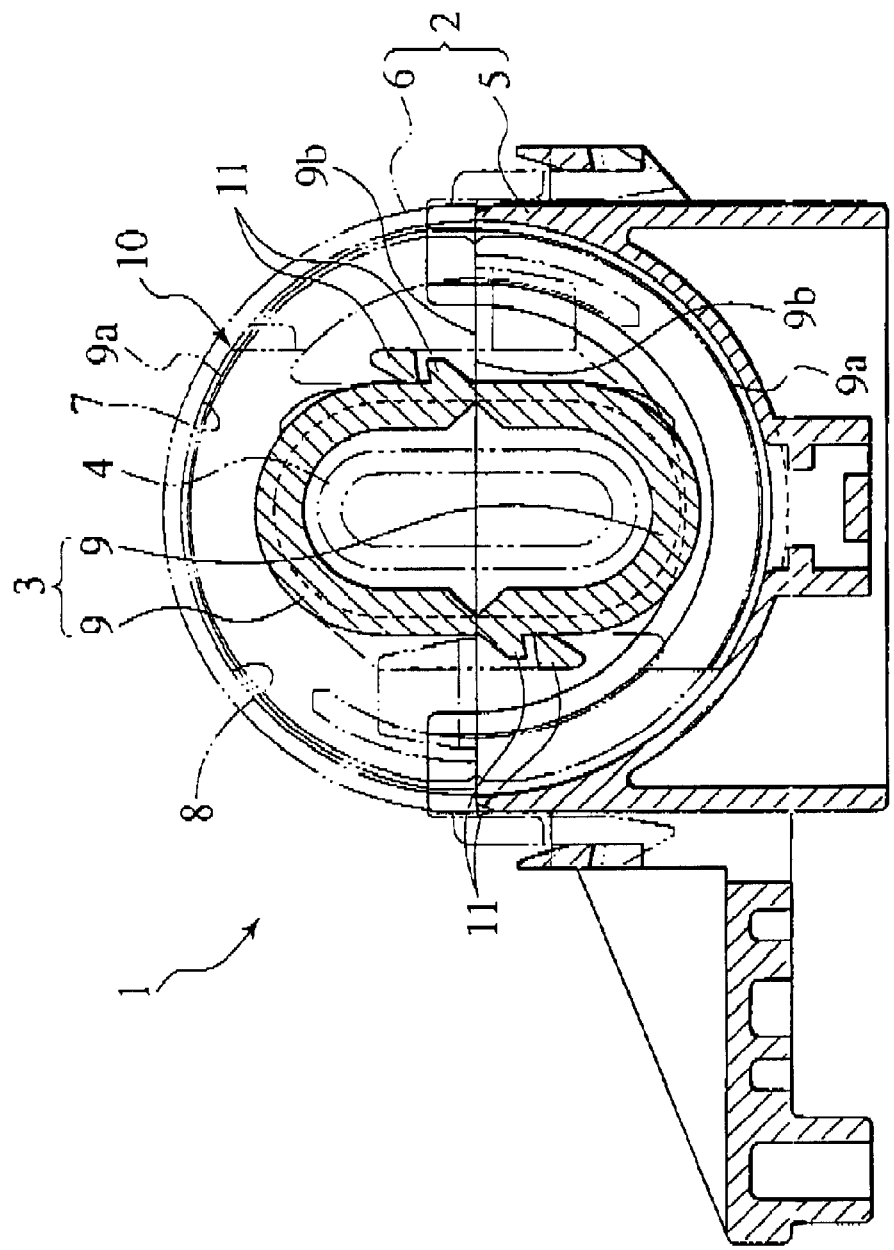
FIG. 2 is a cross sectional view of the conventional rotary holder for the corrugated tube.
Figure 3:
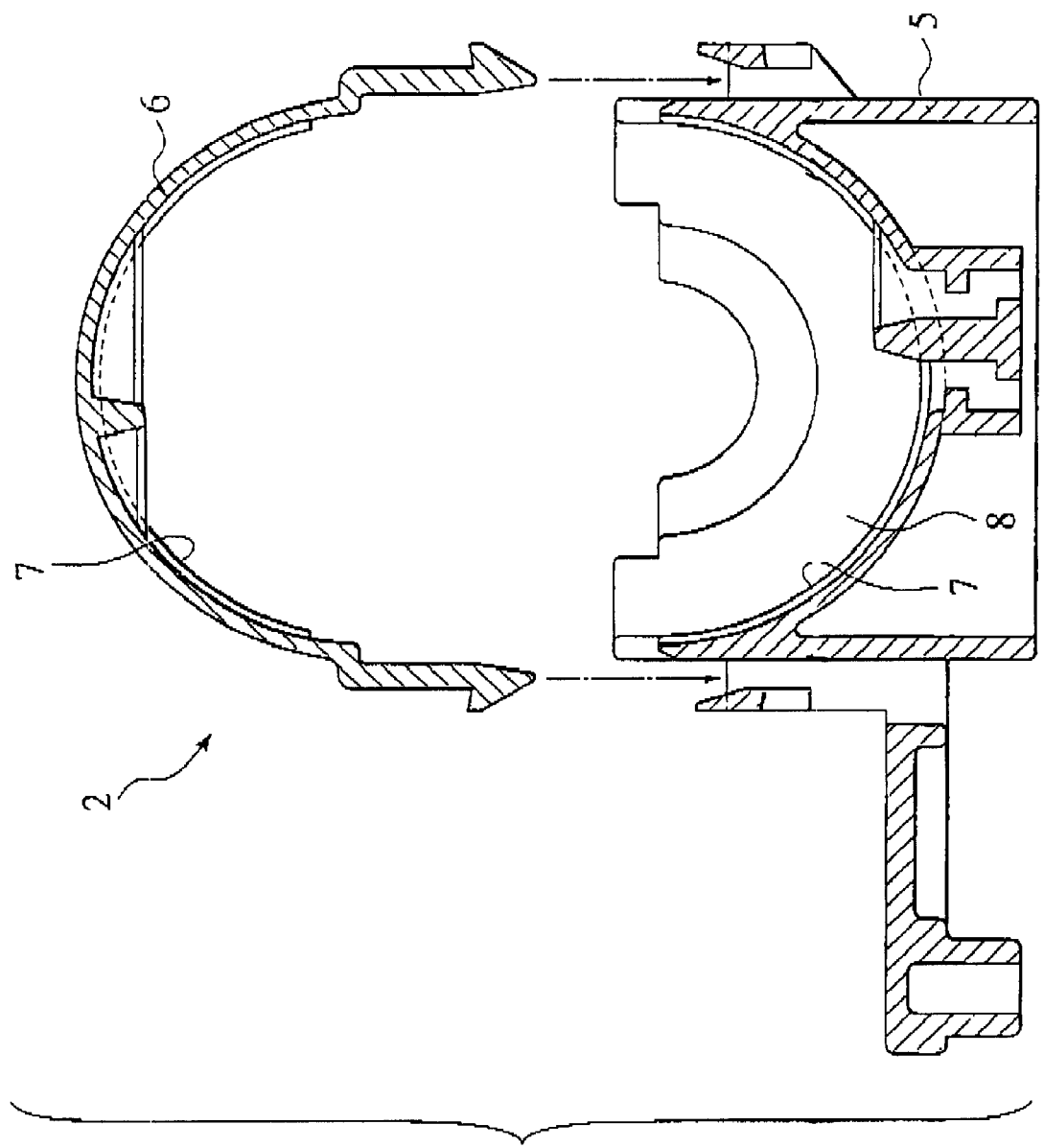
FIG. 3 is an exploded cross sectional view of a conventional outer fixing body.
Figure 4:
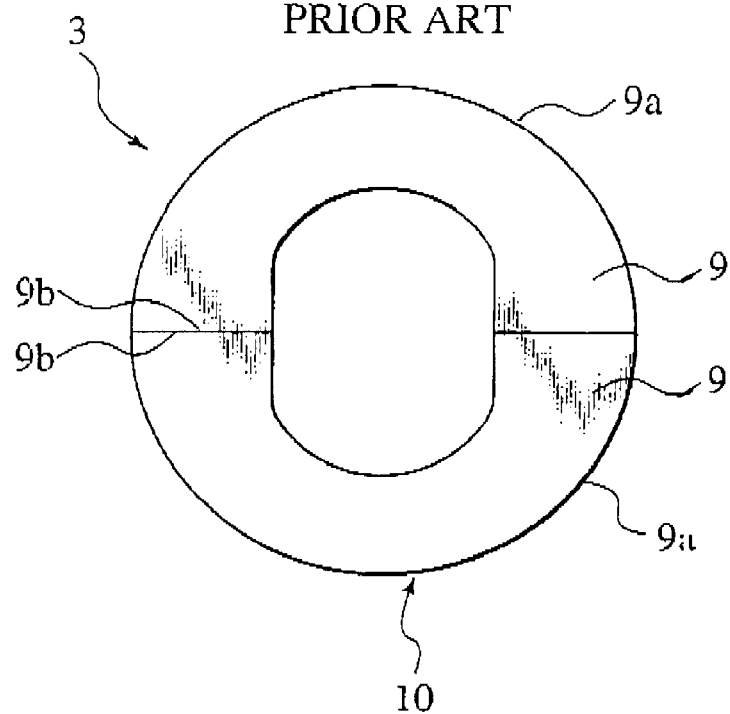
FIG. 4 is a schematic front elevational view of a conventional inner rotary body.
Figure 5:
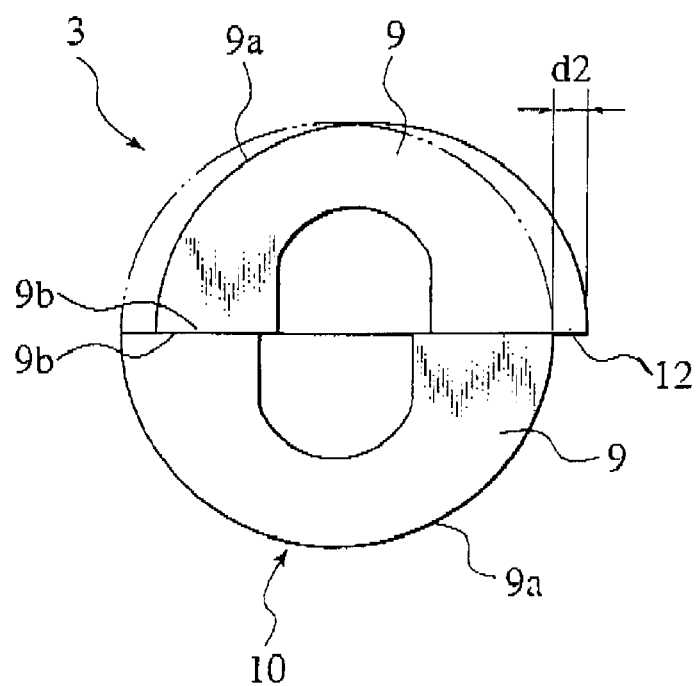
FIG. 5 is a schematic front elevational view showing a state in which respective butt surfaces are displaced between two divided rotary members according to the conventional art.
Figure 6:
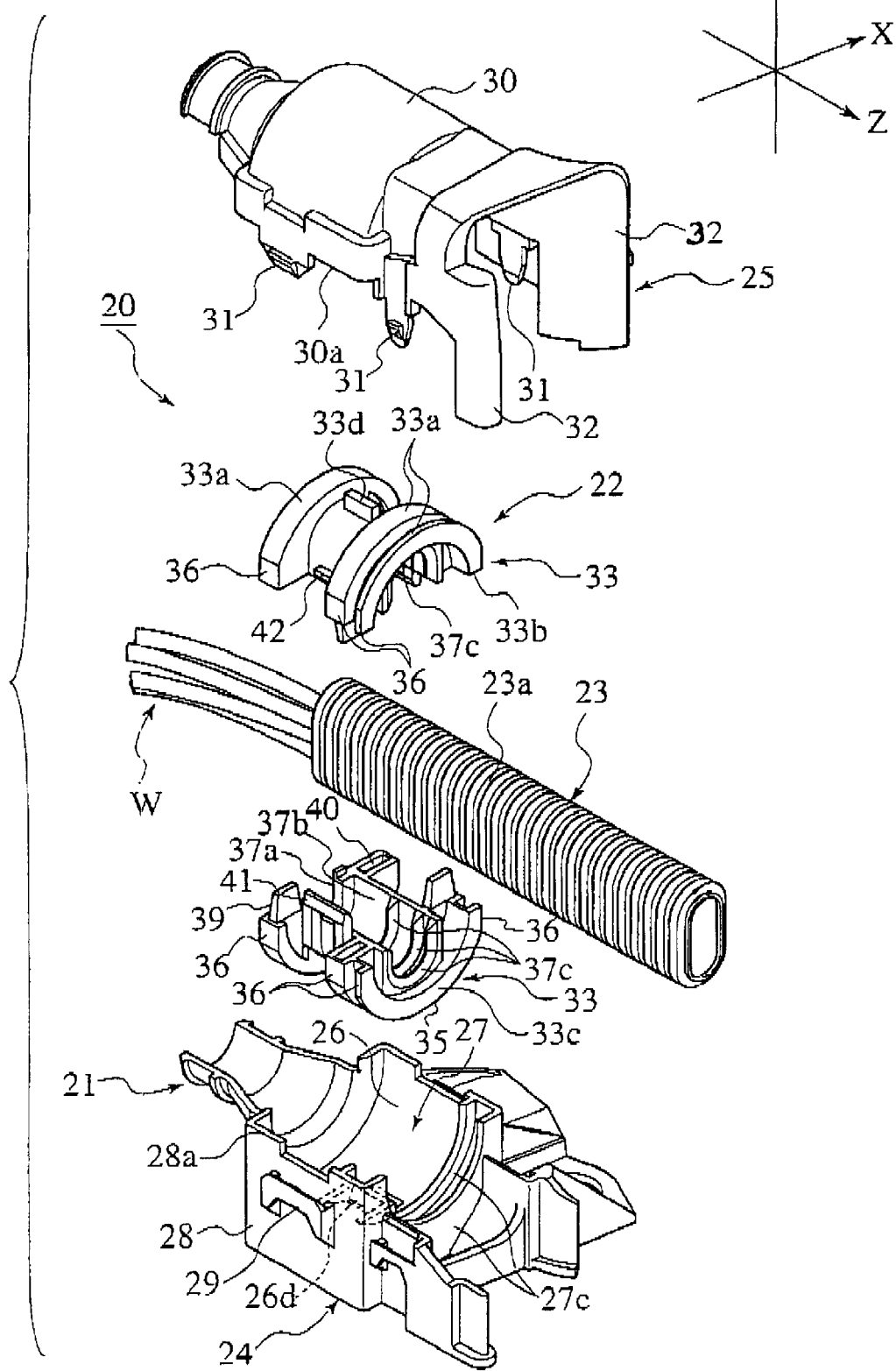
FIG. 6 is an exploded perspective view of a rotary holder for a corrugated tube according to an embodiment of the present invention.
Figure 7:
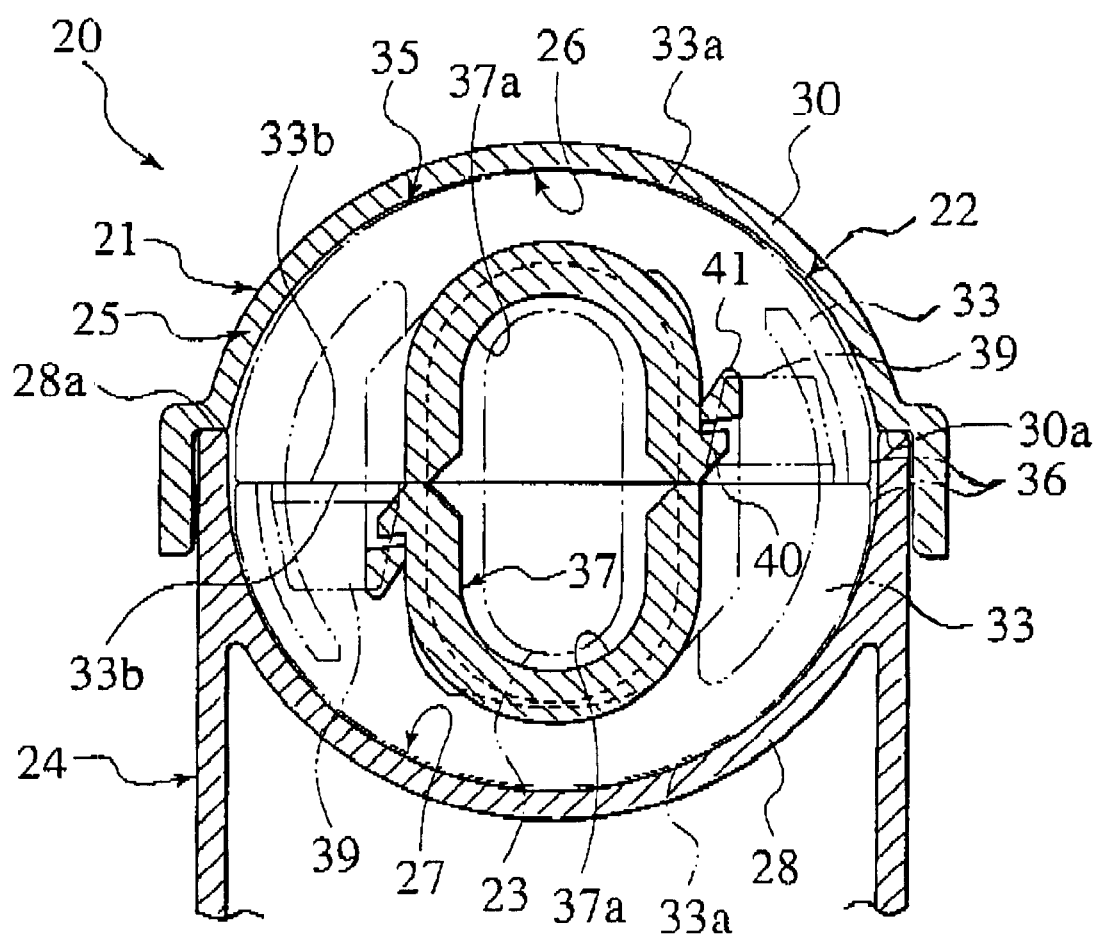
FIG. 7 is a cross sectional view of a main portion of the rotary holder for the corrugated tube according to the embodiment of the present invention.
Figure 8:
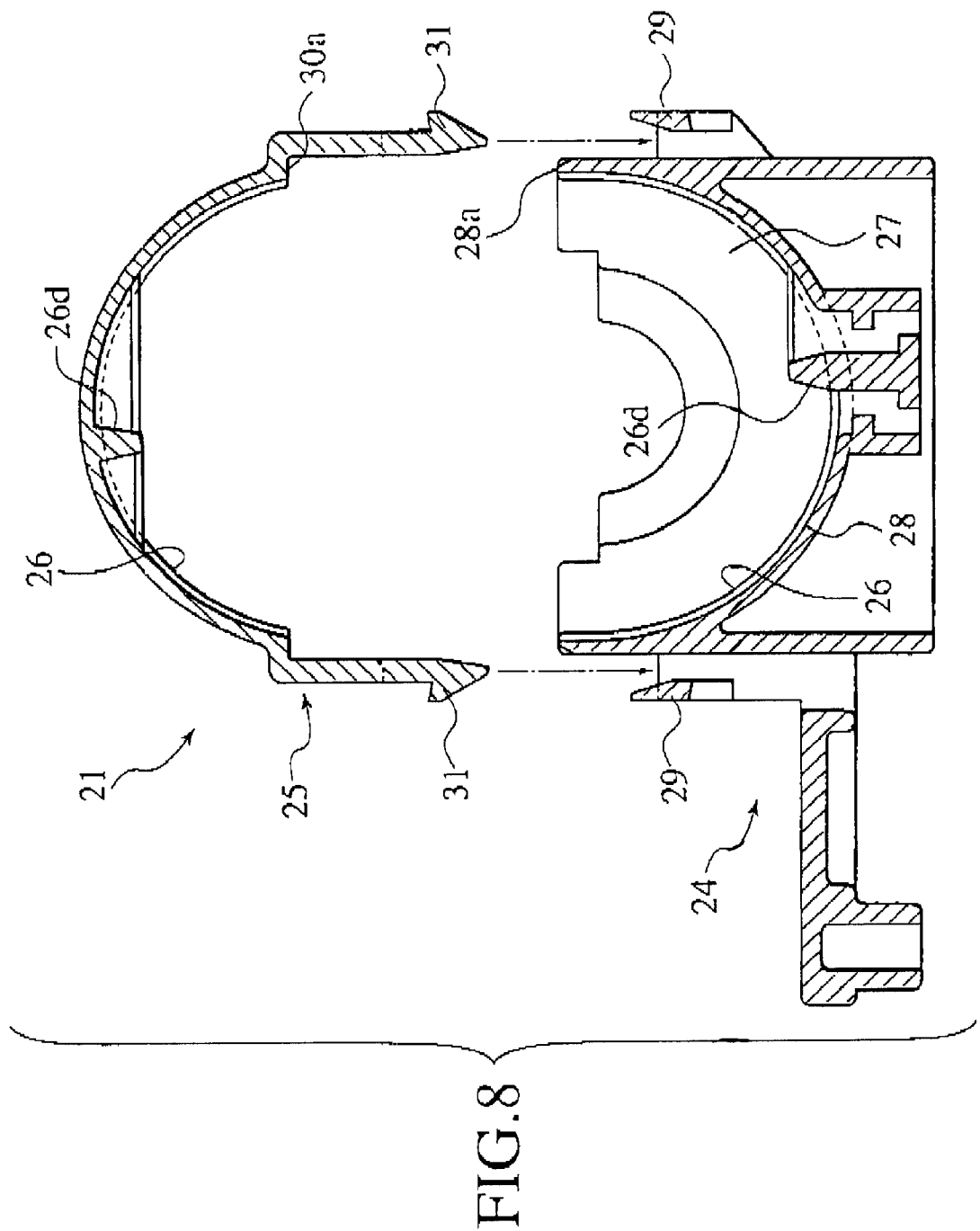
FIG. 8 is an exploded cross sectional view of an outer fixing body according to the embodiment of the present invention.

The outer fixing body 21 is composed of a base member 24 made of synthetic resin and a cover 25 made of synthetic resin. As shown in FIGS. 6 to 8, the outer fixing body 21 is formed by attaching the cover 25 onto the base member 24. The base member 24 has a lower reception case portion 28 which forms a lower half of an inner rotary chamber 27 mentioned below. An upper end surface of the lower reception case portion 28 corresponds to a butt surface 28a. Further, the cover 25 has an upper reception case portion 30 which forms an upper half of the inner rotary chamber 27 mentioned below. An inner lower end surface of the upper reception case portion 30 corresponds to a butt surface 30a. Accordingly, the cover 25 is assembled onto the base member 24 by butting the butt surface 30a of the cover 25 against the butt surface 30a of the base member 24. Further, the upper reception case portion 30 is also assembled onto the lower reception case portion z2 simultaneously, whereby the inner rotary chamber 27 surrounded by the round inner sliding surface 26 is formed. Moreover, two guides 32, 32 in which the corrugated tube 23 protrudes in a direction extending outward (in the direction of Z-axis, as shown FIG. 6) are formed in the cover 25.

As shown in FIGS. 6 and 8, frame-like lock arm receiving portions 29, 29 functioning as a lock means are provided on both side surfaces of the lower reception case portion 28, and lock arm portions 31, 31 functioning as the lock means are provided on both side surfaces of the upper reception case portion 30. The lock arm portions 31, 31 are locked with the lock arm receiving portions 29, 29 respectively, whereby the cover 25 is securely fixed to the base member 24.

Figure 9:
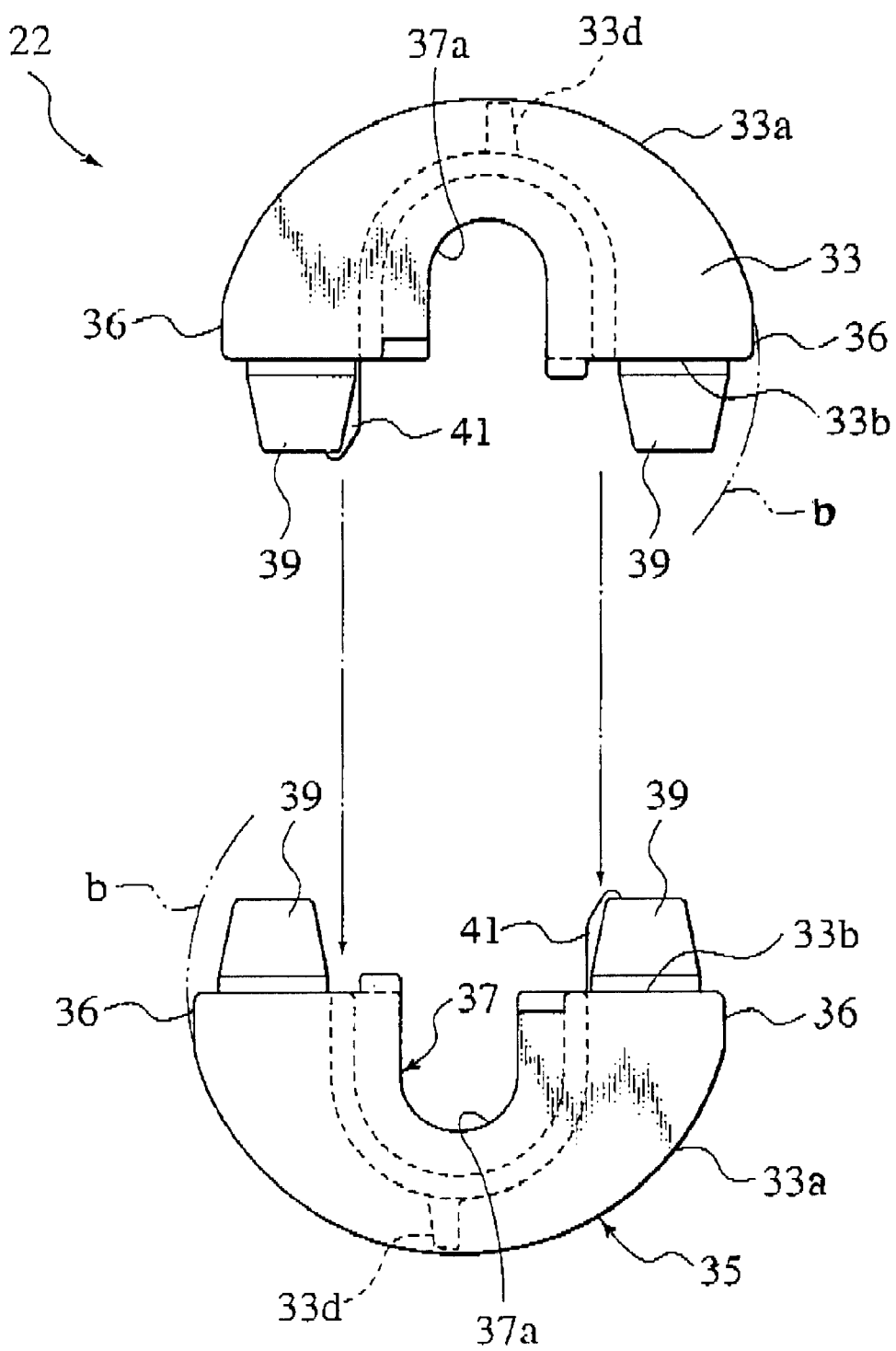
FIG. 9 is an exploded front elevational view of an inner rotary body according to the embodiment of the present invention.
Figure 10:
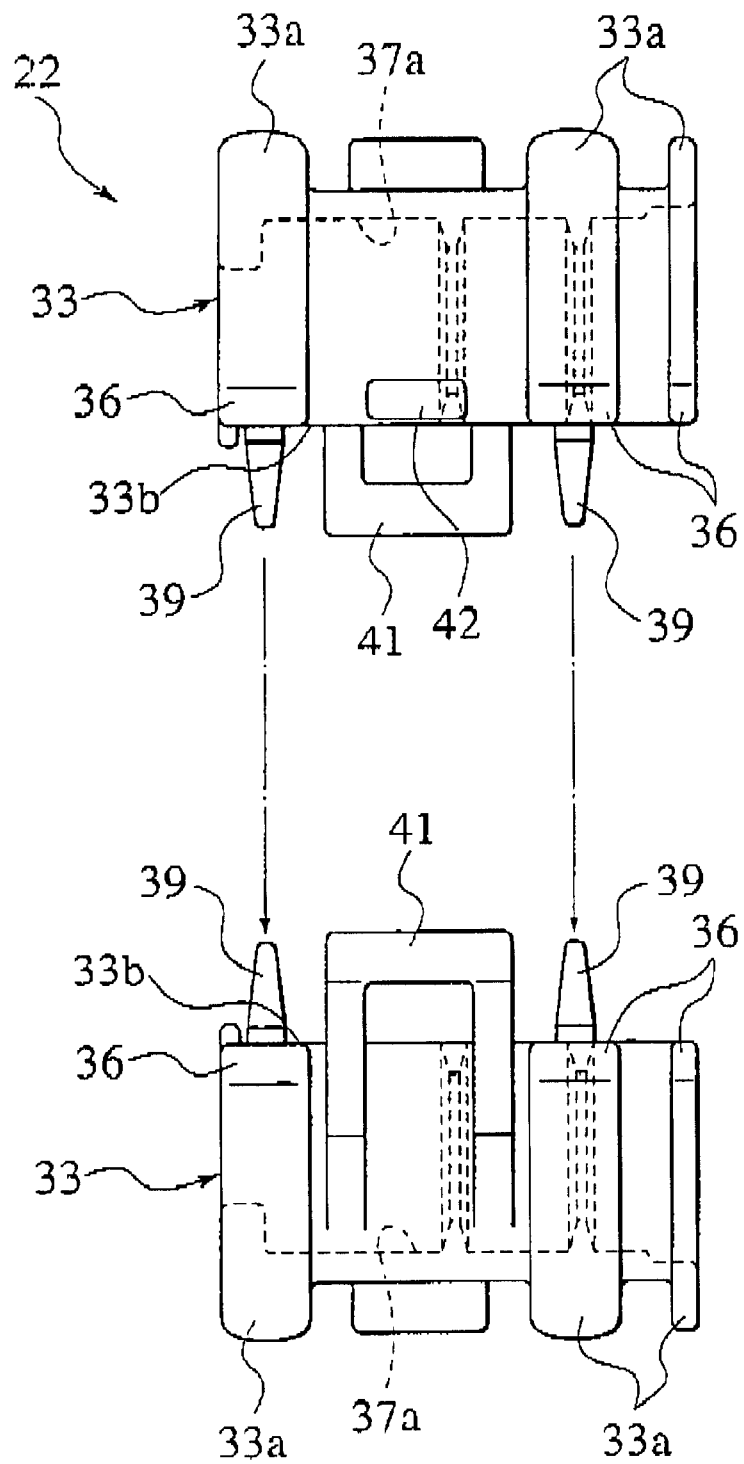
FIG. 10 is an exploded side elevational view of the inner rotary body according to the embodiment of the present invention.

As shown in FIGS. 6 and 9 to 11, the inner rotary body 22 is composed of two divided rotary members 33, 33 each having round arch surface 33a on an outer periphery thereof. Then, one divided rotary member 33 is assembled onto the other divided rotary member 33 by abutting a surface 33b of one divided rotary member 33 against a surface 33b of the other divided rotary member 33. A substantially round outer peripheral sliding surface 35 is formed by the round arch surfaces 33a, 33a of the two assembled divided rotary members 33, 33. Accordingly, the inner rotary body 22 has an outer peripheral sliding surface 35 at three positions thereon. A cut surface 36, as shown in FIG. 9, retracting inside from a rotation locus b of the round arch surface 33a in the divided rotary member 33 is formed in each end portion of the round arch surface 33a in the divided rotary members 33. The cut surface 36 is formed as a flat surface obtained by cutting the round arch surface 33a in a perpendicular direction to the abutting surface 33b, in the end portion of the round arch surface 33a. Accordingly, the outer peripheral sliding surface 35 is formed in a round shape except along the assembly boundary where one divided rotary member 33 is assembled onto the other divided rotary member 33. The surface along the assembly boundary is flat.

A U-shaped groove 37a recessed in a U shape is formed in the divided rotary member 33. The U-shaped grooves 37a, 37a in two divided rotary members 33, 33 face to each other in a state of assembling one divided rotary member 33 onto the other divided rotary member 33, whereby a harness reception port 37 is formed. Further, the inner rotary body 22 holds the corrugated tube 23 containing the wire harness W therein by clamping the corrugated tube 23 in an inner portion of a harness reception chamber 37b positioned in the innermost recess of tee harness reception port 37.

Figure 11:
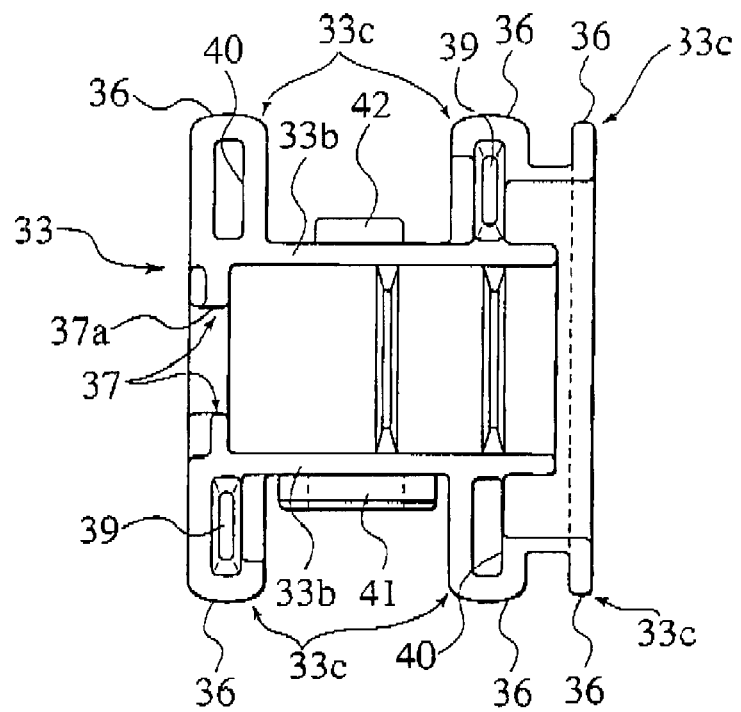
FIG. 11 is a plan view of a divided rotary member according to the embodiment of the present invention.

Further, as shown in FIG. 11, a positioning projection 39 and a positioning groove 40 are provided in each of the butt surfaces 33b, 33b positioned in left and right sides with respect to the harness reception port 37, in the divided rotary member 33. In particular, with respect to the butt surface 33b positioned in a left side of the harness reception port 37, the positioning groove 40 is formed on a top surface of a collar portion 33c existing at the closest position to the harness reception port 37, and the positioning projection 39 is integrally formed in a protruding manner on a top surface of a collar portion 33c existing at the next closest position to the harness reception port 37. Further, with respect to the butt surface 33b positioned in a right side of the harness reception port 37, the positioning projection 39 is integrally formed in a protruding manner on a top surface of a collar portion 33c existing at the closest position to the harness reception port 37, and the positioning groove 40 is formed on a top surface of a collar portion 33c existing at the next closest position to the harness reception port 37. Further, a lock arm receiving portion 42 functioning as a lock means is provided in a protruding manner in an outer wall positioned in a left side of the harness reception port 37. Further, a lock arm portion 41 functioning as the lock means is provided in an outer wall positioned in a right side of the harness reception port 37.

Further, at a time of assembling one divided rotary member 33 onto the other divided rotary member 33, one butt surface 33b can be easily and properly butted against the other butt surface 33b by inserting the positioning projection 39 of one divided rotary member 33 to the positioning groove 40 of the other divided rotary member 33, and inserting the positioning projection 39 of the other divided rotary member 33 to the positioning groove 40 of one divided rotary member 33. Further, one divided rotary member 33 is securely fixed to the other divided rotary member 33 by locking one lock arm portion 41 with the other lock arm receiving portion 42, and locking the other lock arm portion 41 with one lock arm receiving portion 42, in a state of butting one butt surface 33b against the other butt surface 33b.

In this case, as shown in FIG. 6, the round arch collar portion 33c positioned in one end of each of the divided rotary members 33, 33 constituting the inner rotary body 22 is received between a pair of round arch collar portions 27c, 27c provided in one end of the inner rotary chamber 27. Further, a projection 33d provided in a center of the divided rotary member 33 is brought into contact with a projection portion 26d provided on the inner sliding surface 26, whereby the inner rotary body 22 can rotate within a range of an angle of rotation 180 degrees. Further, each of recess portions 23a in the corrugated tube 23 having an oval cross sectional shape (flat type) is engaged with each of a plurality of projection portions 37c provided in the harness reception chamber 37b in each of the divided rotary members 33. The corrugated tube 23 extends past the inner rotary body 22 from the end having the projection portion 37c.

In the structure mentioned above, when the wire harness W moves in the inner portion of the corrugated tube 23 causing a rotation force to be applied to the corrugated tube 23, the inner rotary body 22 exposed to this rotation force rotates in the inner portion of the outer fixing body 21. As mentioned above, because the inner rotary body 22 is free to rotate, the corrugated tube 23 clamped to the rotary holder is also free to rotate.

Figure 13:
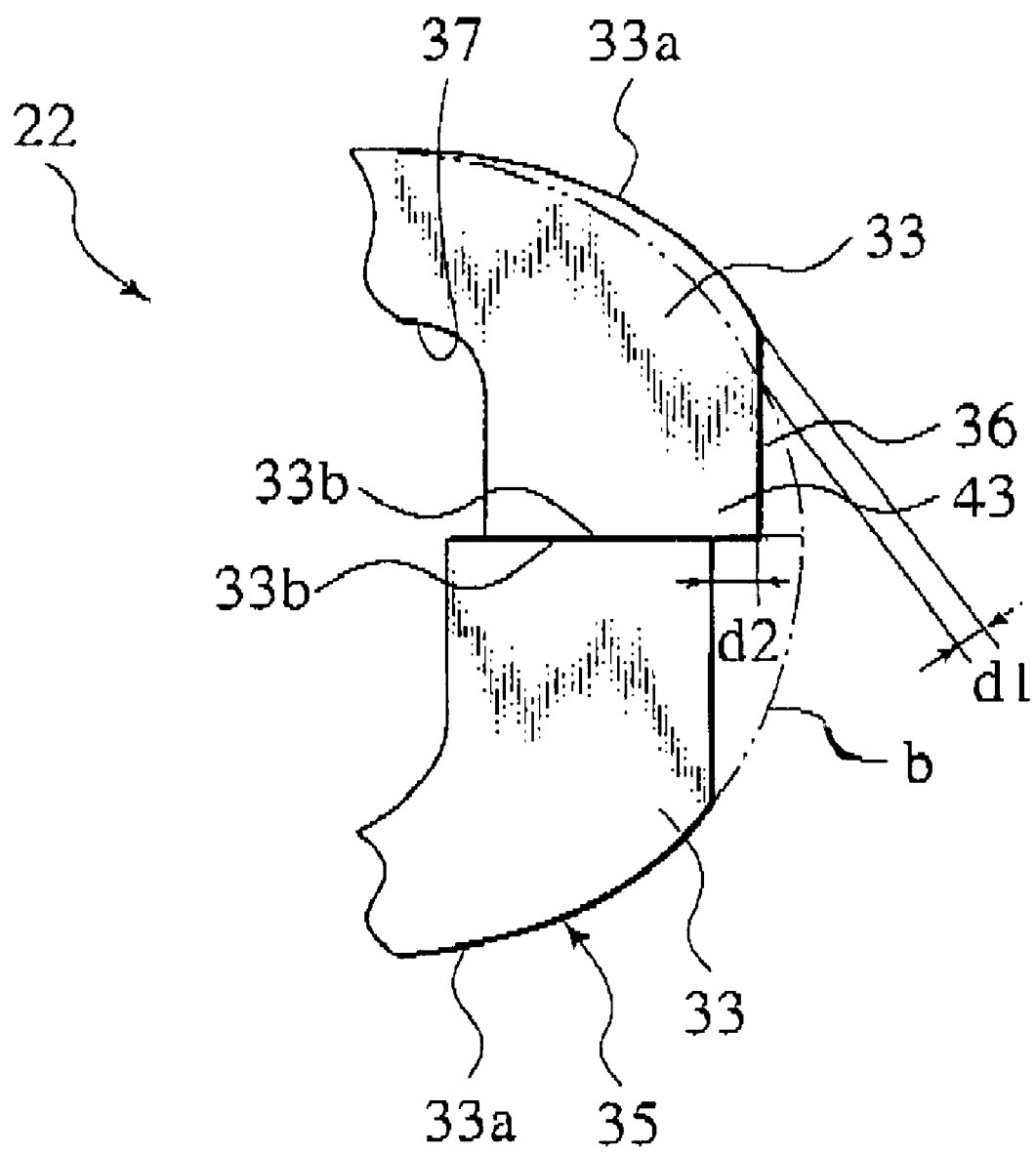
FIG. 13 is a schematic enlarged partly front elevational view showing a state in which respective butt surfaces are displaced between two divided rotary members according to the embodiment of the present invention.

However, there is a risk that the abutting surface 33b of one divided rotary member 33 is displaced from the abutting surface 33b of the other divided rotary member 33, as shown in FIG. 13, due to an outward force applied by the corrugated tube 23 held in the inner portion of the inner rotary body 22 and due to a failure of the lock arm portion 41 and the locked portion 42 provided between a pair of divided rotary members 33, 33. Once the displacement is generated between the abutting surfaces 33b, 33b, an offset portion 43 is generated where the round arch surface 33a of one divided rotary member 33 has been smoothly connected to the round arch surface 33a of the other divided rotary member 33. However, since the cut surface 36 is formed in each end of the round arch surface 33a in the divided rotary member 33, the cut surface 36 does not protrude outside the rotation locus b of the outer peripheral sliding surface 35, where the divided rotary members have been abutted each other, even if the offset portion 43 (an amount of step d2) is generated. Further, the radius of rotation of the inner rotary body 22 is slightly increased equal to an amount of offset d1. Therefore, the amount of increase d1 in the radius of rotation of the inner rotary body 22 according to the present embodiment is less than the amount of increase d2 in the radius of rotation of the inner rotary body according to the conventional embodiment. Therefore, even when the displacement is generated between the abutting surfaces 33b, 33b of divided rotary members 33, 33, the inner rotary body 22 can always smoothly rotate.

That is, in the case of the conventional embodiment, when the displacement is generated between the butt surfaces 9b, 9b of the dividing rotary members 9, 9, the amount of displacement (the amount of step d2) corresponds to a substantial amount of increase in the radius of rotation of the inner rotary body 2. Accordingly, a diameter of the rotation locus of the outer peripheral sliding surface 10 is increased. However, in the case of the present embodiment, even when the displacement is generated between the butt surfaces 33b, 33b of the divided rotary members 33, 33, the amount is displacement (the amount of step d2) does not come up to a length necessary for the cut surface 36 to protrude outside the rotation locus b of the outer peripheral sliding surface 35, in the portion in which the divided rotary members 33, 33 have been butted against each other, due to the formation of the cut surface 36. Further, since the cut surface 36 is formed, the amount of displacement does not directly correspond to the substantial amount of increase in the radius of rotation of the inner rotary body 22, and the diameter of the rotation locus of the outer peripheral sliding surface 35 does not become large so much.

Further, as shown in FIG. 6, two guides 32, 32 protruding in a direction (in the direction Z-axis) in which the corrugated tube 23 extends outward are formed in the cover 25. Therefore, the corrugated tube 23 is in contact with each of the guides 32, 32, whereby it is possible to wholly inhibit the corrugated tube 23 from largely changing in a lateral direction (in the direction X-axis), and it is possible to maintain a change in curvature of the corrugated tube 23 within a fixed value. As a result, it is possible to inhibit the corrugated tube 23 partly contained in the inner rotary body 22 from fluctuating, and it is possible to reduce the outward force applied to the inner rotary body 22 by the corrugated tube 23.

Figure 12:
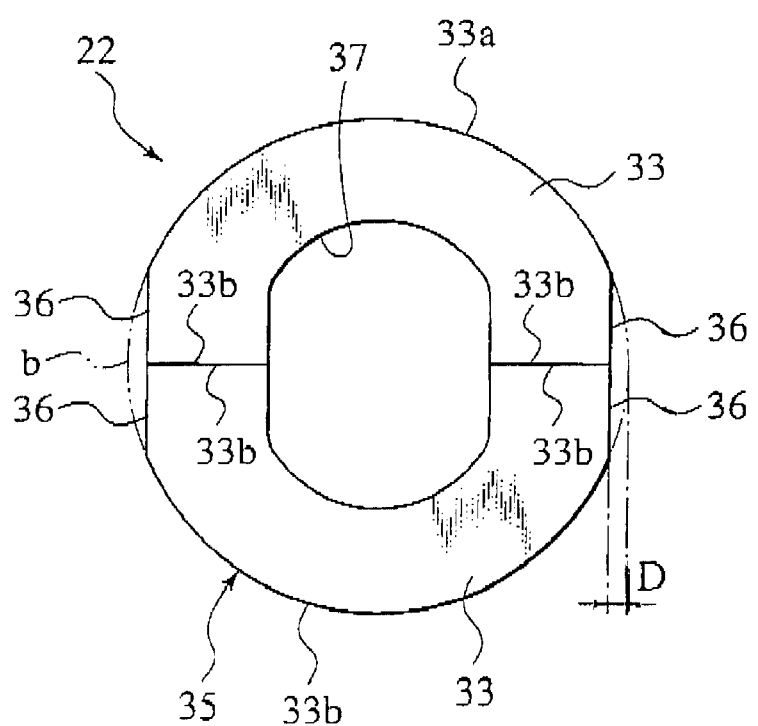
FIG. 12 is a schematic front elevational view of the inner rotary body according to the embodiment of the present invention.

Further, in the embodiment, the cut surface 36 is formed as a flat surface obtained by cutting the round arch surface 33a in the perpendicular direction (in the direction Y-axis) to the butt surface 33b, in each end portion of the round arch surface 33a. As shown in FIG. 12, in the case of cutting the round arch surface 33a, a method of cutting the round arch surface 33a in the perpendicular direction to the butt surface 33b can most effectively take a cut amount D. Accordingly, even in the case that the butt surface 33b of one divided rotary member 33 generates a great displacement with respect to the butt surface 33b of the other divided rotary member 33, it is possible to cope with a sufficiently great displacement by forecasting an amount of displacement expected to be generated, and by previously adjusting the cut amount D. Further, since the cut surface 36 is the flat surface, the divided rotary member 33 can be easily manufactured.

Further, in the present embodiment, since the inner rotary body 22 is composed of two divided rotary members 33, 33 having the same shape, it is sufficient to manufacture one kind of divided rotary member 33. Therefore, it becomes easy to assemble and manufacture the inner rotary body 22, and a cost can be reduced.

In this case, the inner rotary body 22 may bet composed of three or more divided rotary members. Further, the corrugated tube 23 may be formed in a tubular shape having a circular cross sectional shape, in addition to the flat shape having the oval cross sectional shape.

Further, the positioning groove 40 and the positioning projection 39 may be formed on the butt surface 33b positioned in the right side of the harness reception port 37, in sequence from the side of the harness reception port 37. Farther, in the same manner, the positioning projection 39 anti the positioning groove 40 may be formed on the butt surface 33b positioned in the left side of the harness reception port 37, in sequence from the side of the harness reception port 37. Further, the lock receiving port 42 may be provided in a protruding manner on the outer wall positioned in the right side of the harness reception port, and the lock arm portion 41 may be provided on the outer wall positioned in the left side of the harness reception port.

What is claimed is:

1. A rotatable holder comprising:
   an inner body configured to clamp an object, the inner body having a longitudinal axis, and a first and second member coupled together to form at least one outer curved surface and at least one outer flat surface, the at least one outer flat surface intersecting the curved surface and located closer to the longitudinal axis of the inner body than the curved surface; and
   an outer body configured to rotatably receive the inner body.

2. The rotatable holder of claim 1, wherein the at least one outer flat surface is perpendicular to an assembly plane between the first and second members.

3. The rotatable holder of claim 1, wherein the first and second members are substantially identical.

4. The rotatable holder of claim 1, wherein the inner body includes an opening having an oval cross-sectional shape.

5. The rotatable holder of claim 1, wherein the inner body includes an opening having a circular cross-sectional shape.

6. The rotatable holder of claim 1, further including a projection on the inner body adapted to engage a stop on the outer body to limit the rotation of the inner body relative to the outer body.

7. A rotatable holder comprising:
   an inner body configured to clamp an object;
   an outer body configured to rotatably receive the inner body, the outer body including a base member and
   a cover member, configured to be coupled to the base member to enclose the inner body; and
   at least one guide coupled to one of the base member and the cover member, the at least one guide configured to engage the other of the cover and the base member to thereby align the cover to the base member and to resist lateral movement of the object.

8. The rotatable holder of claim 7, wherein the inner body has a longitudinal axis and the rotatable holder includes a first and second member coupled together to form at least one outer curved surface and at least one outer flat surface, the at least one outer flat surface intersecting the at least one outer curved surface and located closer to the longitudinal axis of the inner body than the at least one outer curved surface.

9. The rotatable holder of claim 8, wherein the at least one outer flat surface is perpendicular to an assembly plane between the first and second members.

10. The rotatable holder of claim 8, wherein the first and second members are substantially identical.

11. The rotatable holder of claim 7, wherein the inner body includes an opening having an oval cross-sectional shape.

12. The rotatable holder of claim 7, wherein the inner body includes an opening having a circular cross-sectional shape.

13. The rotatable holder of claim 7, further including a projection on the inner body adapted to engage a stop on the outer body to limit the rotation of the inner body relative to the outer body.

14. A rotatable holder comprising:
   at least two inner body members coupled together having a means for clamping an object, the at least two inner body members forming at least one outer curved surface and at least one outer flat surface retracted within a rotation locus of the at least one outer curved surface; and
   an outer body configured to rotatably receive the at least two inner body members.

15. The rotatable holder of claim 14, wherein the at least two inner body members have abutting horizontal surfaces and the at least one outer flat surface is positioned vertically.

16. The rotatable holder of claim 14, wherein the at least two inner body members are substantially identical.

17. The rotatable holder of claim 14, wherein the clamping means includes an opening having an oval cross-sectional shape.

18. The rotatable holder of claim 14, wherein the clamping means includes an opening having a circular cross-sectional shape.

19. The rotatable holder of claim 14, further including a means for limiting rotation of the at least two inner body members relative to the outer body member.

20. The rotatable holder of claim 14, further including:
   a base member;
   a cover member, configured to be coupled to the base member to enclose the at least two inner body members; and
   at least one guide coupled to one of the base member and the cover member, the at least one guide configured to engage the other of the cover and the base member to thereby align the cover to the base member and to resist lateral movement of the object.

* * * * *